United States Patent
Lee et al.

(10) Patent No.: US 10,177,380 B2
(45) Date of Patent: Jan. 8, 2019

(54) ANODE ACTIVE MATERIAL AND LITHIUM SECONDARY BATTERY INCLUDING THE SAME

(71) Applicant: LG Chem, Ltd., Seoul (KR)

(72) Inventors: Su Min Lee, Daejeon (KR); Dong Sub Jung, Daejeon (KR); Eun Kyung Kim, Daejeon (KR); Sang Wook Woo, Daejeon (KR); Sun Young Shin, Daejeon (KR)

(73) Assignee: LG Chem, Ltd. (KR)

( * ) Notice: Subject to any disclaimer, the term of this patent is extended or adjusted under 35 U.S.C. 154(b) by 362 days.

(21) Appl. No.: 14/767,655

(22) PCT Filed: Dec. 19, 2014

(86) PCT No.: PCT/KR2014/012585
§ 371 (c)(1),
(2) Date: Aug. 13, 2015

(87) PCT Pub. No.: WO2015/093894
PCT Pub. Date: Jun. 25, 2015

(65) Prior Publication Data
US 2016/0181612 A1    Jun. 23, 2016

(30) Foreign Application Priority Data

Dec. 20, 2013 (KR) .................. 10-2013-0160717
Dec. 18, 2014 (KR) .................. 10-2014-0183434

(51) Int. Cl.
*H01M 4/587* (2010.01)
*H01M 4/36* (2006.01)
(Continued)

(52) U.S. Cl.
CPC ............ *H01M 4/587* (2013.01); *H01G 11/24* (2013.01); *H01G 11/32* (2013.01); *H01G 11/38* (2013.01);
(Continued)

(58) Field of Classification Search
None
See application file for complete search history.

(56) References Cited

U.S. PATENT DOCUMENTS 5,527,643 A    6/1996  Sonobe et al.
6,632,569 B1 * 10/2003  Kameda ............... H01M 4/133
                                                    252/502
(Continued)

FOREIGN PATENT DOCUMENTS

CN    101208819 A    6/2008
CN    102844918 A    12/2012
(Continued)

OTHER PUBLICATIONS

Search Report from European Application No. 14872940.3, dated Oct. 31, 2016.
(Continued)

*Primary Examiner* — Tracy M Dove
(74) *Attorney, Agent, or Firm* — Lerner, David, Littenberg, Krumholz & Mentlik, LLP

(57) ABSTRACT

The present invention relates to an anode active material including natural graphite and mosaic coke-based artificial graphite, and a lithium secondary battery including the same. According to an embodiment of the present invention, an anode active material including natural graphite and mosaic coke-based artificial graphite is used, when applied to a lithium secondary battery, intercalation and deintercalation of lithium ions is more facilitated and conductivity of an electrode is improved even if no or little conductive (Continued)

material is used. Furthermore, the increase in conductivity can lead to not only a further improvement in rate performance of a lithium secondary battery but also a reduction in interfacial resistance.

18 Claims, 5 Drawing Sheets

(51) Int. Cl.
  *H01M 10/052* (2010.01)
  *H01G 11/24* (2013.01)
  *H01G 11/38* (2013.01)
  *H01G 11/50* (2013.01)
  *H01G 11/32* (2013.01)
  *H01M 4/133* (2010.01)
  *H01M 4/02* (2006.01)
  *H01G 11/28* (2013.01)
  *H01G 11/42* (2013.01)
  *H01G 11/06* (2013.01)

(52) U.S. Cl.
  CPC ............ *H01G 11/50* (2013.01); *H01M 4/364* (2013.01); *H01M 4/366* (2013.01); *H01M 10/052* (2013.01); *H01G 11/06* (2013.01); *H01G 11/28* (2013.01); *H01G 11/42* (2013.01); *H01M 4/133* (2013.01); *H01M 2004/027* (2013.01); *Y02E 60/13* (2013.01)

(56) References Cited

U.S. PATENT DOCUMENTS

| | | |
|---|---|---|
| 2004/0023115 A1 | 2/2004 | Kato et al. |
| 2004/0101756 A1* | 5/2004 | Koyama ............... H01M 4/133 429/231.8 |
| 2007/0128518 A1 | 6/2007 | Uono et al. |
| 2009/0130561 A1 | 5/2009 | Matsumoto et al. |
| 2010/0297500 A1 | 11/2010 | Kawai et al. |
| 2012/0045642 A1* | 2/2012 | Nishimura ............ H01M 4/133 428/367 |
| 2012/0097580 A1 | 4/2012 | Stiller |
| 2013/0140488 A1 | 6/2013 | Sotowa et al. |
| 2013/0302675 A1 | 11/2013 | Kouzu et al. |
| 2013/0330620 A1 | 12/2013 | Nishimura et al. |
| 2014/0255292 A1 | 9/2014 | Wakizaka et al. |
| 2015/0318545 A1 | 11/2015 | Satow et al. |

FOREIGN PATENT DOCUMENTS

| | | |
|---|---|---|
| EP | 2667436 A1 | 11/2013 |
| JP | H07-037618 | 2/1995 |
| JP | H07-296814 A | 11/1995 |
| JP | 2000149946 | 5/2000 |
| JP | 2002124255 | 4/2002 |
| JP | 2009187924 A | 8/2009 |
| JP | 2010009951 A | 1/2010 |
| JP | 2012023048 A | 2/2012 |
| KR | 20040012541 A | 2/2004 |
| KR | 20090016462 A | 2/2009 |
| TW | 201212362 A | 3/2012 |
| TW | 201230475 A | 7/2012 |
| WO | 2012144617 A1 | 10/2012 |
| WO | 2013058348 A1 | 4/2013 |
| WO | 2014103281 A1 | 7/2014 |

OTHER PUBLICATIONS

International Search Report for Application No. PCT/KR2014/012585 dated Mar. 30, 2015.

* cited by examiner

ANODE ACTIVE MATERIAL AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR/2014/012585, filed Dec. 19, 2014, which claims priority to Korean Patent Application No. 10-2013-0160717, filed on Dec. 20, 2013 and Korean Patent Application No. 10-2014-0183434, filed on Dec. 18, 2014, the disclosures of which are incorporated herein by reference.

TECHNICAL FIELD

The present invention relates to an anode active material and a lithium secondary battery, and more particularly, to an anode active material including natural graphite and mosaic coke-based artificial graphite and a lithium secondary battery including the anode active material.

BACKGROUND ART

Recent developments in information and communication industry enable compact, lightweight, thin, and portable electronic devices, and thus high energy densification of batteries used as power supplies of such electronic devices are increasingly demanded. A lithium secondary battery may be a most suitable one to satisfy such demands, and thus studies on the lithium secondary battery are being actively carried out.

Carbonaceous materials are generally used as an anode material of a lithium secondary battery, and the carbonaceous materials include crystalline carbon and amorphous carbon. Representative examples of crystalline carbon may include graphite carbon, such as natural graphite or artificial graphite; and examples of amorphous carbon may include non-graphitizable carbon (hard carbon) obtained by carbonization of a polymer resin and graphitizable carbon (soft carbon) obtained by heat treatment of pitch.

In general, soft carbon is made by applying 1,000 levels of heat to coke which is a by-product produced during crude oil refining, and exhibits high output and short charging time unlike a conventional graphite anode active material or hard carbon-based anode active material.

On the other hand, hard carbon may be produced by carbonization of a material such as resin, thermosetting polymer, or wood. When such hard carbon is used as an anode material of a lithium secondary battery, it has a high reversible capacity of 400 mAh/g or more due to micropores but has low initial efficiency of approximately 70%. Thus, it is disadvantageous in that when hard carbon is used for an electrode of a lithium secondary battery, irreversible consumption of lithium is significant.

Such irreversibility is observed because solid electrolyte interphase (SEI) as a surface film is created by dissociation of electrolyte on the surface of an electrode during charging, or because lithium stored in carbon particles during charging is prevented from being discharged during discharging. Of these two cases, the former case is more problematic and the creation of a surface film is known as a major cause of irreversibility.

Moreover, it is known that most of high-capacity graphite materials have a highly developed layer structure, and thus have a high degree of graphitization and a flake shape. In the case of such flake-shaped graphite, regions where Li ions are intruded between the layers thereof, that is edge surfaces, are small. Thus, when the flake-shaped graphite is used as an anode active material of a lithium secondary battery, a high rate discharge characteristic, which is a characteristic in the case of discharge with high current, is deteriorated.

Furthermore, spherical natural graphite is disadvantageous in that it has a limited ionic conductivity, and empty spaces are created between active materials to increase the resistance of an electrode when only the spherical natural graphite is used as an anode active material, thereby bringing about a decrease in rate performance.

Therefore, it is necessary to develop an anode active material capable of replacing typical anode active materials, and reducing interfacial resistance and improving rate performance when applied to a lithium secondary battery.

DISCLOSURE OF THE INVENTION

Technical Problem

It is an object of the present invention to provide an anode active material capable of reducing interfacial resistance and having improved rate performance as well as improving conductivity.

It is another object of the present invention to provide an anode having a specific orientation ratio and electrode density by including the anode active material, and a resultant lithium secondary battery having improved performance.

The object of the present invention is not limited to the above-described objects, and other objects which are not described herein will be clearly understood to those skilled in the art from the description below.

Technical Solution

According to an embodiment of the present invention, an anode active material including natural graphite and mosaic coke-based artificial graphite is provided.

Also, according to another embodiment of the present invention, an anode including the above-described anode active material is provided.

Furthermore, the present invention provides a lithium secondary battery using the above-described anode, the battery including a cathode, an anode and a separator disposed between the cathode and the anode.

Advantageous Effects

According to an embodiment of the present invention, since an anode active material including natural graphite and mosaic coke-based artificial graphite is used, intercalation/deintercalation of lithium ions is more facilitated and conductivity of an electrode is improved even if no or little conductive material is used. Furthermore, the increase in conductivity can lead to not only a further improvement in rate performance of a lithium secondary battery but also a reduction in interfacial resistance.

BRIEF DESCRIPTION OF THE DRAWINGS

The accompanying drawings herein illustrate exemplary embodiments of the present invention and, together with the description, serve to provide a further understanding of the inventive concept, and thus the present invention should not be construed as being limited to only the drawings.

MODE FOR CARRYING OUT THE INVENTION

Hereinafter, the present invention will be described in more detail to facilitate understanding the present invention.

Terms or words used in the description and claims should not be restrictively interpreted as ordinary or dictionary meanings, but should be interpreted as meanings and concepts conforming to the inventive concept on the basis of a principle that an inventor can properly define the concept of a term to explain his or her own invention in the best ways.

An anode active material according to an embodiment of the present invention may include natural graphite and mosaic coke-based artificial graphite.

Figure 1:
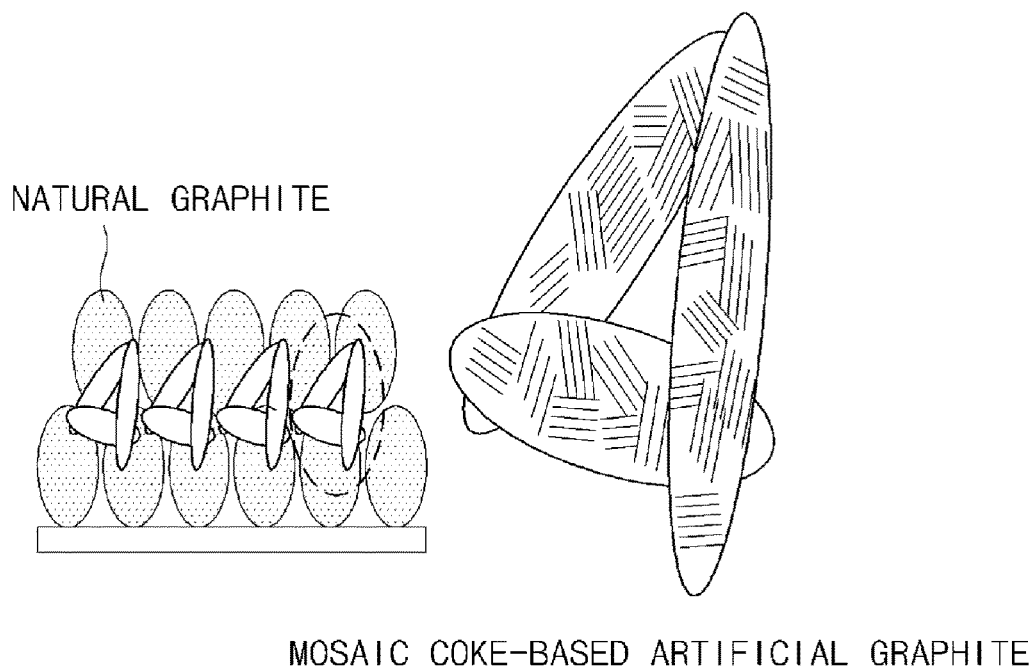
FIG. 1 illustrates a schematic diagram of an anode active material according to an embodiment of the present invention.
Figure 2:
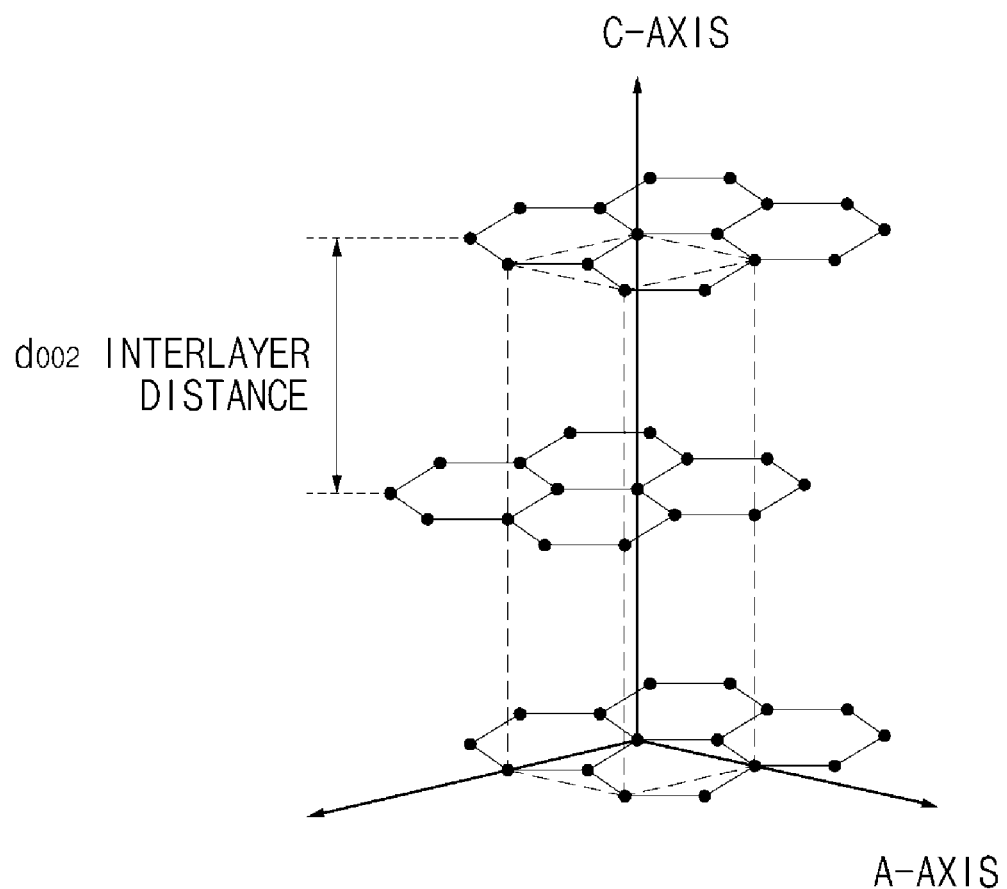
FIG. 2 illustrates a structure of a graphite particle.

More specifically, the anode active material according to an embodiment of the present invention, as shown in FIG. 1, includes natural graphite and mosaic coke-based artificial graphite as being mixed together. Thus, when compared with the case where only natural graphite is used, mosaic coke-based artificial graphite fills empty spaces between active materials so that conductivity may increase and therefore rate performance of a secondary battery may be improved and interfacial resistance may be reduced.

Also, the mosaic coke-based artificial graphite has its own unique random crystal structure, and thus further facilitates intercalation and deintercalation of lithium ions to thereby further improve performance of a secondary battery. In addition, the mosaic coke-based artificial graphite is included in an anode active material together with natural graphite, and can thus serve as a conductive material. Therefore, it is possible to obtain the conductivity which is equal to or higher than that of an anode active material using a typical conductive material even if no or little conductive material is used.

Furthermore, since the mosaic coke-based artificial graphite may express characteristics due to the aforementioned random crystal structure that a mosaic texture has, generally available needle coke-based artificial graphite having a plate or needle shape may be difficult to facilitate intercalation and deintercalation of lithium ions, and thus difficult to obtain advantages such as an improvement of rate performance or a reduction in interfacial resistance.

Specifically, mosaic coke-based artificial graphite included in an anode active material according to an embodiment of the present invention, which is made of, for example, coal and coke as a raw material, may have an anisotropic structure which is identified as a mosaic texture when a polished surface of a carbonized material is observed using a polarization microscope. Also, the anisotropic structure of the mosaic texture has a random crystal structure, and thus may further facilitate intercalation and deintercalation of lithium ions when applied to a lithium secondary battery.

Mosaic coke-based artificial graphite being usable according to an embodiment of the present invention may have an average major axis length of, for example 5 to 30 μm, and preferably 10 to 25 μm.

When the major axis length of the mosaic coke-based artificial graphite is less than 5 μm, initial efficiency of a battery is reduced due to an increase in a specific surface area, and thus battery performance may be degraded. When the major axis length is greater than 30 μm, it may cause a short circuit due to penetration of the mosaic coke-based artificial graphite into a separator, and may cause low capacity retention due to low packing density.

Also, it is preferable that the mosaic coke-based artificial graphite according to an embodiment of the present invention has a specific surface area of 3.0 to 4.0/g, and compressed density of 1.5 to 2.1 g/cc under the pressure of 8 to 25 mPa.

When the compressed density is less than 1.5 g/cc, energy density per unit volume may be reduced. When the compressed density is greater than 2.1 g/cc, it may cause a reduction in initial efficiency and deterioration in high-temperature properties, and may also cause a reduction in adhesive strength of an electrode.

Also, the mosaic coke-based artificial graphite preferably has such a crystal habit that $L_c$ (002) is 21.6 to 21.9 nm, and $d_{002}$ is 0.3377 nm or less, preferably 0.3357 to 0.3377 nm, and most preferably 0.3376 nm, wherein $L_c$ (002) is a crystallite size in C-axis direction and $d_{002}$ is interplanar spacing of (002) plane during XRD measurement.

The $d_{002}$ of mosaic coke-based artificial graphite can be calculated by Equation 1 below using Bragg's law after determining peak positions by integration from a graph of two values measured using XRD.

$$d_{002} = \lambda/2 \sin\theta \qquad \text{<Equation 1>}$$

Also, $L_c$ (002), which is a crystallite size in C-axis direction of a particle, can be calculated by Equation 2 below as Scherrer equation which calculates a crystallite size $L_c$ of mosaic coke-based artificial graphite.

$$L_c = \frac{K\lambda}{\beta_{(2\theta)}\cos\theta} \qquad \text{<Equation 2>}$$

where, K is a Scherrer constant (K=0.9),
β is a half value width,
λ is a wavelength (0.154056 nm), and
θ is an angle at a maximum peak.

According to an embodiment of the present invention, the mosaic coke-based artificial graphite may have $L_c$ (002) of 21.6 to 21.9 nm, wherein $L_c$ (002) is a crystallite size in C-axis direction during XRD measurement using CuK. When the $L_c$ of the mosaic coke-based artificial graphite falls within the above range, diffusion velocity of lithium ions becomes higher due to a high electrical conductivity, and thus intercalation and deintercalation of lithium ions may be performed more easily. On the other hand, when the $L_c$ is greater than 21.9 nm, an increase in moving distance of lithium ions may act as resistance to cause deterioration in output characteristics; and when the $L_c$ is less than 21.6 nm, it may be difficult to express the unique capacity of graphite.

It is preferable that an anode active material according to an embodiment of the present invention includes natural graphite together with the mosaic coke-based artificial graphite.

In the case of artificial graphite, charge/discharge efficiency is high but cost is high, and also dispersibility in aqueous slurry is very low, so that the artificial graphite has difficulties in an aspect of processability and it is difficult to obtain desired physical properties of a battery due to a low capacity.

On the contrary, since natural graphite is inexpensive and also shows a high voltage flatness and a high capacity close to a theoretical capacity, natural graphite is very useful as an active material.

According to an embodiment of the present invention, either plate-shaped or spherical natural graphite may be used as the natural graphite, but spherical natural graphite may be preferable.

In an anode active material according to an embodiment of the present invention, it is preferable that a weight ratio of the natural graphite to the mosaic coke-based artificial graphite is 1:0.1 to 1:1, and preferably 1:0.3 to 1:1.

When the weight of the mosaic coke-based artificial graphite is greater than the above range, the mosaic coke-based artificial graphite covers natural graphite in an excess amount to increase a specific surface area, and thus dissociation of an electrolytic solution may be dominant; on the other hand, when the weight is less than the above range, the mosaic coke-based artificial graphite may not completely fill empty spaces between natural graphite particles, and thus conductivity may be reduced.

According to an embodiment of the present invention, the natural graphite may have an average particle size $D_{50}$ of 5 to 30, and preferably 20 to 25. When the average particle size $D_{50}$ of the spherical natural graphite is less than 5, initial efficiency of a secondary battery is reduced due to an increase in a specific surface area, and thus battery performance may be reduced. On the other hand, when the average particle size $D_{50}$ is greater than 30, it may cause a short circuit by penetration of the natural graphite into a separator, and may cause low capacity retention due to low packing density.

The average particle size of the natural graphite according to an embodiment of the present invention may be measured, for example, using a laser diffraction method. The laser diffraction method is generally capable of measuring particle sizes in a range of submicron to a few millimeters, and obtaining results with high reproducibility and high resolution. The average particle size $D_{50}$ of the natural graphite may be defined as a particle size based on 50% of particle size distribution.

The average particle size $D_{50}$ of the natural graphite according to an embodiment of the present invention may be measured, for example, in such a way that natural graphite is dispersed in a solution of ethanol/water, the resultant solution is introduced into a commercially available particle size measuring apparatus using laser diffraction (for example, Microtrac MT 3000) and irradiated with ultrasonic wave having a frequency of about 28 kHz at power of 60 W, and then the average particle size $D_{50}$ is calculated based on 50% of particle size distribution in the measuring apparatus.

According to an embodiment of the present invention, spherical natural graphite satisfying the average particle size range of the natural graphite, may be obtained in such a way, but not limited to, that natural graphite particles are introduced into a spheroidizing apparatus (Nara Hybridization System, NHS-2), and then spheroidized, for example, for 10 to 30 minutes at a rotor speed of about 30 to 100 m/sec.

Furthermore, according to an embodiment of the present invention, it is preferable that the natural graphite has specific surface area (BET-SSA) of 2 to 8 $m^2/g$. When the specific surface area of the natural graphite is less than 2 $m^2/g$, adhesive strength between electrodes may be reduced. The specific surface area of the natural graphite greater than 8 $m^2/g$ causes an increase in initial irreversible capacity during charge/discharge, and is thus undesirable.

According to an embodiment of the present invention, the specific surface area may be measured using a Brunauer-Emmett-Teller (BET) method. For example, it may be measured with BET six-point method by means of a nitrogen gas adsorption method using a porosimetry analyzer (Bell Japan Inc., Belsorp-II mini).

Meanwhile, a method of preparing the anode active material according to an embodiment of the present invention may include mixing natural graphite and mosaic coke-based artificial graphite.

In the method of preparing the anode active material according to an embodiment of the present invention, the mixing for preparing an anode active material may be performed by simple mixing or mechanical milling using an ordinary method known in the art. For example, the mixing may be performed simply using a mortar, or a carbon composite may be formed by compressive stress which is mechanically applied by rotating the mixture with revolutions of 100 to 1,000 rpm using a blade or a ball mill.

According to an embodiment of the present invention, an anode may be provided using the anode active material, wherein the anode includes a current collector and the anode active material formed on at least one surface of the current collector.

An anode according to an embodiment of the present invention includes both natural graphite and mosaic coke-based artificial graphite in an anode active material, and thus an orientation ratio I110/I004 may be 0.08 to 0.086, and preferably 0.0819 to 0.0836, under the compressed density of 1.40 to 1.85 g/cc.

According to an embodiment of the present invention, an orientation ratio of an anode is adjusted by using the mosaic coke-based artificial graphite, and thus performance of a lithium secondary battery may be further improved.

According to an embodiment of the present invention, the orientation ratio of an anode may be dependent on a compressive force which is applied when the anode active material is coated and rolled onto an anode current collector.

In an anode according to an embodiment of the present invention, the orientation ratio may be measured, for example, by X-ray diffraction (XRD).

An orientation ratio of an anode according to an embodiment of the present invention is an area ratio (110)/(004) which is obtained by measuring (110) and (004) planes of an anode, more specifically, of an anode active material included in the anode using XRD, and then integrating peak intensities of (110) and (004) planes. More specifically, XRD measurement conditions are as follows.

Target: Cu(Kα line) graphite monochromator

Slit: divergence slit=1°, receiving slits=0.1, scattering slit=1°

Measuring range and step angle/measuring time:

(110) plane: 76.5°<2θ<78.5°, 0.01°/3 sec (004) plane: 53.5°<2θ<56.0°, 0.01°/3 sec, where, 2θ is a diffraction angle. The above XRD measurement is an example, thus other measuring methods are also used, and the orientation ratio of the anode may be measured through the method as described above.

An anode according to an embodiment of the present invention may be prepared by an ordinary method known in the art. For example, the anode active material is mixed with a solvent, and a binder (if necessary), and the mixture is agitated to prepare slurry, then the slurry is applied (coated) onto a current collector made of a metallic material, and thereafter the current collector coated with the slurry is compressed and dried to prepare an anode.

According to an embodiment of the present invention, the anode active material slurry may further include a conductive material. The available conductive material may be any one or a mixture of two or more selected from the group consisting of natural graphite, artificial graphite, carbon black, acetylene black, ketjenblack, channel black, furnace black, lamp black, thermo-black, carbon nanotubes, fullerene, carbon fiber, metal fiber, fluorocarbon, aluminum, nickel powder, zinc oxide, potassium titanate, titanium oxide, and polyphenylene derivatives, and preferably carbon black.

As similar to the anode, a cathode according to the present invention may also be prepared by an ordinary method in the art.

For example, a cathode active material is mixed with a binder and a solvent, and a conductive material and a dispersant (if necessary), and the mixture is agitated to prepare slurry, then the slurry is applied onto a current collector, and thereafter the current collector coated with the slurry is compressed to prepare an electrode.

A binder used in the present invention is used to maintain a green body by binding particles in cathode and anode active materials, and a binder such as polytetrafluoroethylene (PTFE), polyvinylidene fluoride (PVDF), or styrene-butadiene rubber (SBR) is used. A binder includes a solvent-based binder (that is, a binder using an organic solvent as a solvent) represented by PVDF, and a water-based binder (that is a binder using water as a solvent) which is any one or a mixture of two or more selected from the group consisting of acrylonitrile-butadiene rubber, SBR, and acrylic rubber. The water-based binder is economical, environmentally friendly, and also harmless to health of workers contrary to the solvent-base binder, and has a high binding effect as compared with the solvent-based binder, so that the proportion of an active material per unit volume can be increased to achieve high capacity. SBR may be preferably used as the water-based binder.

A lithium-containing transition metal oxide, which is generally used in the art, may be preferably used as a cathode active material. Also, the lithium-containing transition metal oxide may be coated with a metal such as aluminum (Al), or a metal oxide. Sulfides, selenides, halides, and the like may also be used in addition to the lithium-containing transition metal oxide.

Once the electrodes were prepared, a lithium secondary battery may be prepared which is generally used in the art and includes an electrolytic solution and a separator disposed between the cathode and the anode, together with the electrodes.

In the electrolytic solution used in the present invention, any material which is generally used in the electrolytic solution for lithium secondary batteries may be unrestrictedly used as a lithium salt which may be included as an electrolyte, and an anion of the lithium salt may be, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3SO_2^-$, $CH_3CO_2^-$, $SCN^-$ and $(CF_3CF_2SO_2)_2N^-$.

In the electrolytic solution used in the present invention, any material which is generally used in the electrolytic solution for lithium secondary batteries may be unrestrictedly used as an organic solvent included in the electrolytic solution.

Furthermore, a general porous polymer film which has been conventionally used as a separator may be used as the separator, and for example, a porous polymer film which is made of polyolefin polymer such as ethylene homopolymer, propylene homopolymer, ethylene/butene copolymer, ethylene/hexene copolymer, and ethylene/methacrylate copolymer, may be used alone or in a laminated form thereof. Alternatively, general porous non-woven fabrics such as non-woven fabrics made of glass fiber having a high melting point, and polyethyleneterephthalate fiber may be used as the separator, but the separator is not limited thereto.

A lithium secondary battery of the present invention is not particularly limited in terms of a shape, but may have, for example, a cylinder shape using a can, a square shape, a pouch shape, or a coin shape.

Hereinafter, the present invention will be described in detail with reference to Examples in order to concretely describe the present invention. The invention may, however, be embodied in many different forms and should not be construed as being limited to the embodiments set forth herein; rather, these embodiments are provided to more completely describe the concept of the invention to those of ordinary skill in the art.

EXAMPLES

Hereinafter, the present invention is described with reference to Examples and Experimental Examples, but not limited thereto.

Preparation of Anode Active Material

Example 1

Natural graphite particles having an average particle size of 100 μm were introduced into a spheroidizing apparatus (Nara Hybridization System, NHS-2), and then spheroidized for 10 minutes at a rotor speed of 65 m/sec to obtain spherical natural graphite particles having an average particle size $D_{50}$ of 20 μm, FWHM of 7.0 μm, and BET specific surface area of 2.60 $m^2/g$.

Mosaic coke-based artificial graphite (Hitachi chemical, MAGE3) having a major axis length of about 20 μm, a specific surface area of 3 to 4 $m^2/g$, and a compressive density of 1.7 to 1.8 g/cc under the pressure of 12 to 16 mPa, was used.

The spherical natural graphite and the mosaic coke-based artificial graphite were mixed at a weight ratio of 1:0.3, and homogeneously agitated using a mortar to prepare an anode active material.

Example 2

An anode active material was prepared by the same method as Example 1 except that the spherical natural graphite and the mosaic coke-based artificial graphite were mixed at a weight ratio of 1:1.

Comparative Example 1

An anode active material was prepared by the same method as Example 1 except that 100% of spherical natural graphite was used without mosaic coke-based artificial graphite.

Comparative Example 2

An anode active material was prepared by the same method as Example 1 except that the spherical natural graphite and the mosaic coke-based artificial graphite were mixed at a weight ratio of 1:0.05.

Comparative Example 3

An anode active material was prepared by the same method as Example 1 except that the spherical natural graphite and the mosaic coke-based artificial graphite were mixed at a weight ratio of 1:1.2.

<Preparation of Lithium Secondary Battery>

Example 3

Preparation of Anode

The anode active material obtained in Example 1, SBR as a binder, carboxy methyl cellulose (CMC) as a thickener, and acetylene black as a conductive material were mixed at a weight ratio 95:2:2:1, and then the mixture was mixed with water ($H_2O$) which was a solvent, to prepare homogeneous anode slurry. The prepared anode slurry was coated onto one surface of a copper current collector to have a thickness of 65 μm, and the coated current collector is dried and rolled and then punched into a desired size to prepare an anode.

Preparation of Lithium Secondary Battery

Ethylene carbonate (EC) and diethyl carbonate (DEC) were mixed at volume ratio of 30:70, and then $LiPF_6$ was added into the non-aqueous electrolyte solvent to prepare a non-aqueous electrolytic solution of 1M $LiPF_6$.

Also, a lithium metal foil was used as a counter electrode, that is a cathode, and a polyolefin separator was disposed between both electrodes, and then the electrolytic solution was injected to prepare a coin-shaped half-cell.

Example 4

An anode and a lithium secondary battery were prepared by the same method as Example 3 except that the anode active material prepared in Example 2 was used.

Comparative Examples 4 to 6

Anodes and lithium secondary batteries were prepared by the same method as Example 3 except that the anode active materials prepared in Comparative Examples 1 to 3 were used.

Example 5

An anode and a lithium secondary battery were prepared by the same method as Example 3 except that the anode active material prepared in Example 2 was used and any conductive material was not added during preparation of the anode.

Comparative Example 7

An anode and a lithium secondary battery were prepared by the same method as Example 5 except that needle coke-based artificial graphite instead of mosaic coke-based artificial graphite was mixed with natural graphite at a weight ratio of 1:1, then the mixture was used as an anode active material, and any conductive material was not added during preparation of the anode.

Experimental Example 1: Measurement of Orientation Ratio

XRD diffraction measurements using Cu(K line) were performed on the anodes prepared in Examples 3 and 4. Orientation ratios were calculated by an area ratio (110)/(004) which was obtained by measuring (110) and (004) planes of an anode active material included in the anode using XRD, and then integrating peak intensities of (110) and (004) planes. More specifically, XRD measurement conditions were as follows.

Target: Cu(Kα line) graphite monochromator
Slit: divergence slit=1°, receiving slits=0.1, scattering slit=1°
Measuring range and step angle/measuring time:
(110) plane: 76.5°<2θ<78.5°, 0.01°/3 sec
(004) plane: 53.5°<2θ<56.0°, 0.01°/3 sec, where, 2θ is a diffraction angle.

Figure 3:
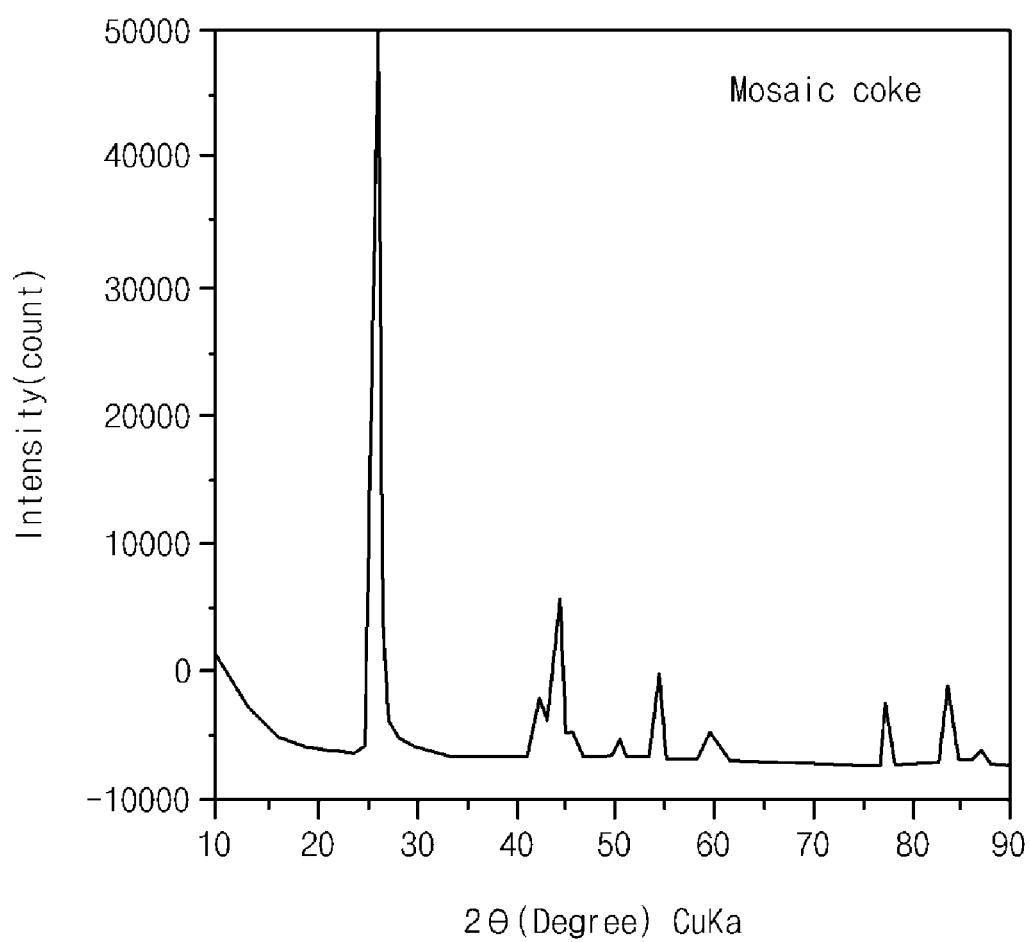
FIG. 3 is a graph showing an XRD measurement result of mosaic coke-based artificial graphite used according to an embodiment of the present invention.

XRD measurements were performed on the mosaic coke-based artificial graphite used in Examples 1 and 2, and the results thereof were shown in FIG. 3. $L_c$ (002) and $d_{002}$ of the mosaic coke-based artificial graphite were calculated using Equations 1 and 2 below.

$$d_{002} = \lambda/2 \sin \theta \qquad \text{<Equation 1>}$$

Also, $L_c$ (002), which is a crystallite size in C-axis direction of a particle, can be calculated by Equation 2 below as Scherrer equation which calculates a crystallite size $L_c$ of mosaic coke-based artificial graphite.

$$L_c = \frac{K\lambda}{\beta_{(2\theta)}\cos\theta} \qquad \langle\text{Equation 2}\rangle$$

where, K is a Scherrer constant (K=0.9),
β is a half value width,
λ is a wavelength (0.154056 nm), and
θ is an angle at a maximum peak.

As shown in FIG. 3, the mosaic coke-based artificial graphite showed such a crystal habit that $L_c$ (002) was 21.6 to 21.9 nm and $d_{002}$ was 0.3376 nm, wherein $L_c$ (002) is a crystallite size in C-axis direction and $d_{002}$ is interplanar spacing of (002) plane during XRD measurement.

Experimental Example 2: Rate Performance Evaluation A

Rate performances of the lithium secondary batteries obtained in Examples 3 and 4, and Comparative Examples 4 to 6 were measured in a voltage range of 0 to 1.5V at room temperature. Batteries were charged under 0.1 C constant-current/constant-voltage (CC/CV) condition up to 1.5V, and then discharged in a constant current mode until current reached 0.1 C at 5 mV. Thereafter, the measurement was finished.

Figure 4:
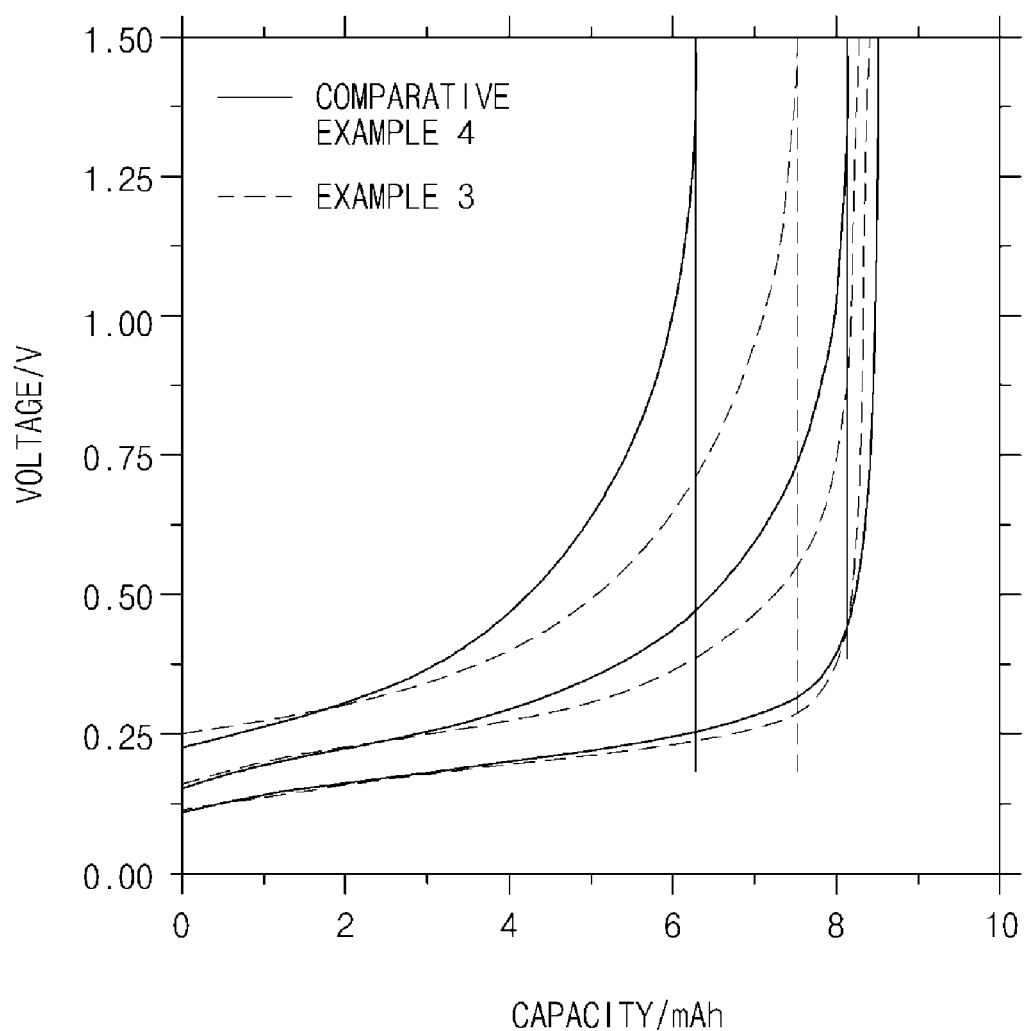
FIG. 4 is a graph showing measurement results for rate performance of lithium secondary batteries prepared in Example 3 according to an embodiment of the present invention and Comparative Example 4.

As shown in FIG. 4, from comparative analysis of each rate performance for 0.2 C, 0.5 C, and 1 C in a voltage range of 0 to 1.5V at room temperature, it can be seen that the lithium secondary battery in Example 3, using the anode active material in Example 1 where the natural graphite and the mosaic coke-based artificial graphite are mixed, has the improved rate performance which is higher by about 5-10% than that of the lithium secondary battery in Comparative Example 4 using the anode active material in Comparative Example 1 where the mosaic coke-based graphite is not used.

Furthermore, in order to investigate rate performance according to a mixing ratio by weight of natural graphite to mosaic coke-based artificial graphite, each rate performance for 0.2 C, 0.5 C, and 1 C in a voltage range of 0 to 1.5V at room temperature was compared for the lithium secondary batteries in Examples 3 and 4, and Comparative Examples 5 and 6. The results are shown in Table 1 below.

TABLE 1

| | Anode active material (weight ratio of natural graphite to mosaic coke-based artificial graphite) | Rate performance | | |
|---|---|---|---|---|
| | | 0.2 C | 0.5 C | 1 C |
| Example 3 | 1:0.3 | 100% | 97.5% | 81.2% |
| Example 4 | 1:1 | 100% | 98.6% | 89.7% |
| Comparative Example 6 | 1:0.05 | 100% | 95.9% | 76.7% |
| Comparative Example 7 | 1:1.2 | 100% | 94.8% | 75.8% |

As shown in Table 1, it can be found that the anode active materials in Examples 3 and 4, in which spherical natural graphite and mosaic coke-based artificial graphite are mixed at a weight ratio of 1:0.3 to 1:1 and used as the anode active material, has improved rate performance, particularly for 0.5 C and 1 C, as compared with the anode active material in Comparative Example 5 in which natural graphite and mosaic coke-based artificial graphite are mixed at a weight ratio 1:0.05, that is a small amount of mosaic coke-based artificial graphite is used, and the anode active material in Comparative Example 6 in which natural graphite and mosaic coke-based artificial graphite are mixed at a weight ratio 1:1.2, that is an excess amount of mosaic coke-based artificial graphite is mixed.

Experimental Example 3: Rate Performance Evaluation B

In order to investigate rate performance according to the type of artificial graphite mixed with natural graphite, rate performance during charge/discharge was evaluated for the lithium secondary batteries in Example 5 and Comparative Example 7. Each rate performance during charging up to 0.005V was measured under 0.2 C CC/CV, 0.2 C constant-current, 0.5 C constant-current, and 1.0 C constant-current conditions. Each rate performance during discharging was measured for 0.2 C, 0.5 C, 1 C, and 2 C in a voltage range of 0.005 to 1.5V at room temperature. The results are shown in Table 2 below.

TABLE 2

| | Rate during charging | | | | Rate during discharging | | | |
|---|---|---|---|---|---|---|---|---|
| | 0.2 C | 0.2 C | 0.5 C | 1.0 C | 0.2 C | 0.5. C | 1 C | 2 C |
| Example 5 | 100 | 76.0 | 39.3 | 15.1 | 100 | 99.6 | 94.6 | 70.8 |
| Comparative Example 8 | 100 | 70.0 | 33.6 | 10.0 | 100 | 86.5 | 86.5 | 56.8 |

As shown in Table 2, it can be found that the lithium secondary battery in Example 5 in which spherical natural graphite and mosaic coke-based artificial graphite are mixed at a weight ratio of 1:1 and used as the anode active material, has improved rate performance during charging by about 5 to 10%, and improved rate performance during discharging by about 10 to 15%, than that those of the lithium secondary battery in Comparative Example 7 in which natural graphite and needle coke-based artificial graphite are mixed at a weight ratio of 1:1.

Experimental Example 4: Evaluation of Electrode Resistance

Figure 5:
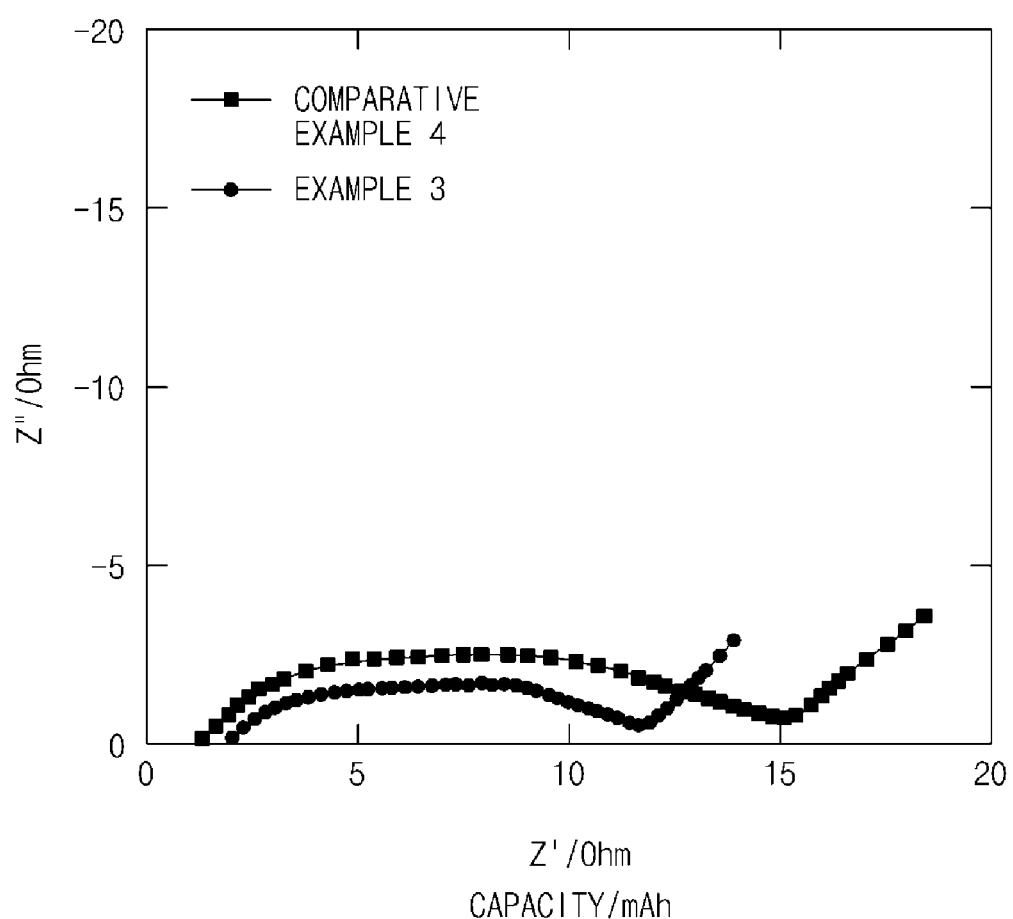
FIG. 5 is a graph showing measurement results for resistance of an electrode, as measured for anodes in lithium secondary batteries prepared in Example 3 according to an embodiment of the present invention and Comparative Example 4.

The lithium secondary battery in Example 3 where the anode including spherical natural graphite and mosaic coke-based artificial graphite was used, and the lithium secondary battery in Comparative Example 4 where the anode including only spherical natural graphite was used, were charged and discharged for a long period, and then resistance of each electrode was measured. The results are shown in FIG. 5. Measurement conditions are as follows.

Sample preparation: Lithium secondary batteries in Example 3 and Comparative Example 4 were charged and discharged during 200 cycles, and then disassembled to obtain only anodes, and then symmetric cells were made using the obtained anodes to measure impedances.

Impedance frequency range: 100,000 to 0.005 Hz

As shown in FIG. 5, it can be seen that when the lithium secondary battery in Example 3 is subjected to charge/discharge for a long period, half circle shown in the graph is smaller and thus interfacial resistance is reduced in the case of using the anode including spherical natural graphite and mosaic coke-based artificial graphite, such as in Example 3, as compared with Comparative Example 4 in which the anode including only spherical natural graphite is used.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. An anode active material, comprising natural graphite and mosaic coke-based artificial graphite, wherein a weight ratio of the natural graphite to the mosaic coke-based artificial graphite is 1:0.1 to 1:1; wherein the mosaic coke-based artificial graphite has $L_c$ (002) of 21.6 nm to 21.9 nm, wherein the $L_c$ (002) is a crystallite size in C-axis direction during XRD measurement; and wherein the mosaic coke-based artificial graphite has a specific surface area of 3.0 to 4.0 m$^2$/g, and a compressed density of 1.5 to 2.1 g/cc under a pressure of 8 to 25 mPa.

2. The anode active material of claim 1, wherein the mosaic coke-based artificial graphite has an average major axis length of 5 μm to 30 μm.

3. The anode active material of claim 1, wherein the mosaic coke-based artificial graphite has $d_{002}$ of 0.3377 nm or less, wherein the $d_{002}$ is interplanar spacing of (002) plane during XRD measurement.

4. The anode active material of claim 1, wherein the natural graphite has a spherical shape.

5. The anode active material of claim 4, wherein the natural graphite has an average particle size $D_{50}$ of 5 to 30 μm.

6. The anode active material of claim 1, wherein the natural graphite has a specific surface area (BET) of 2 to 8 m²/g.

7. An anode, comprising:
a current collector; and
the anode active material of claim 1, disposed on at least one surface of the current collector.

8. The anode of claim 7, wherein an orientation ratio of the anode, which is an area ratio of 1110/1004, is 0.08 to 0.086 under a second compressed density of 1.40 to 1.85 g/cc.

9. A lithium secondary battery, comprising the anode of claim 7.

10. An anode active material, comprising natural graphite and mosaic coke-based artificial graphite, wherein a weight ratio of the natural graphite to the mosaic coke-based artificial graphite is 1:0.1 to 1:1; wherein the mosaic coke-based artificial graphite has $L_c$ (002) of 21.6 nm to 21.9 nm, wherein the $L_c$ (002) is a crystallite size in C-axis direction during XRD measurement; and wherein the mosaic coke-based artificial graphite has a specific surface area of 3.0 to 4.0 m²/g, and a compressed density of 1.7 to 1.8 g/cc under a pressure of 12 to 16 mPa.

11. The anode active material of claim 10, wherein the mosaic coke-based artificial graphite has an average major axis length of 5 μm to 30 μm.

12. The anode active material of claim 10, wherein the mosaic coke-based artificial graphite has $d_{002}$ of 0.3377 nm or less, wherein the $d_{002}$ is interplanar spacing of (002) plane during XRD measurement.

13. The anode active material of claim 10, wherein the natural graphite has a spherical shape.

14. The anode active material of claim 13, wherein the natural graphite has an average particle size $D_{50}$ of 5 to 30 μm.

15. The anode active material of claim 10, wherein the natural graphite has a specific surface area (BET) of 2 to 8 m²/g.

16. An anode, comprising:
a current collector; and
the anode active material of claim 10, disposed on at least one surface of the current collector.

17. The anode of claim 16, wherein an orientation ratio of the anode, which is an area ratio of 1110/1004, is 0.08 to 0.086 under a second compressed density of 1.40 to 1.85 g/cc.

18. A lithium secondary battery, comprising the anode of claim 16.

* * * * *